United States Patent
Karnes

(10) Patent No.: US 6,839,383 B1
(45) Date of Patent: Jan. 4, 2005

(54) METHOD AND SYSTEM FOR TESTING A DIGITAL SUBSCRIBER LINE MODEM

(75) Inventor: Joshua D. Karnes, Leander, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/522,657

(22) Filed: Mar. 10, 2000

(51) Int. Cl.⁷ .............................. H04B 1/38; H04L 5/16
(52) U.S. Cl. ...................... 375/222; 375/224; 375/225; 375/227
(58) Field of Search ................ 375/222, 350, 375/260, 231, 219, 224, 225, 226, 227, 228; 370/242, 210

(56) References Cited

U.S. PATENT DOCUMENTS

| | | | |
|---|---|---|---|
| 5,852,630 A | * 12/1998 | Langberg et al. | ........... 375/219 |
| 6,058,162 A | 5/2000 | Nelson et al. | ................ 379/27 |
| 6,111,936 A | 8/2000 | Bremer | ......................... 379/28 |
| 6,154,524 A | 11/2000 | Bremer | ......................... 379/27 |
| 6,192,109 B1 | 2/2001 | Amrany et al. | ................ 279/30 |
| 6,219,378 B1 | * 4/2001 | Wu | ............................ 375/231 |
| 6,430,219 B1 | 8/2002 | Zuranski et al. | ............ 375/231 |
| 6,510,184 B1 | * 1/2003 | Okamura | ..................... 375/260 |
| 6,526,105 B1 | * 2/2003 | Harikumar et al. | ......... 375/350 |

* cited by examiner

*Primary Examiner*—Stephen Chin
*Assistant Examiner*—Curtis Odom
(74) *Attorney, Agent, or Firm*—Baker Botts L.L.P.

(57) ABSTRACT

A method for testing the frequency response of a communication device that when operated determines a signal-to-noise ratio for a plurality of frequency bands includes receiving a signal-to-noise ratio generated by the communication device for each of the plurality of frequency bands. The method also includes receiving the amount of noise at each of the plurality of frequency bands, and determining, for each of the plurality of frequency bands, the magnitude of the signal at each of the plurality of frequency bands based on the signal-to-noise ratio and the amount of noise at each frequency band. Thereby the frequency response of the communication device is indeed determined.

22 Claims, 5 Drawing Sheets

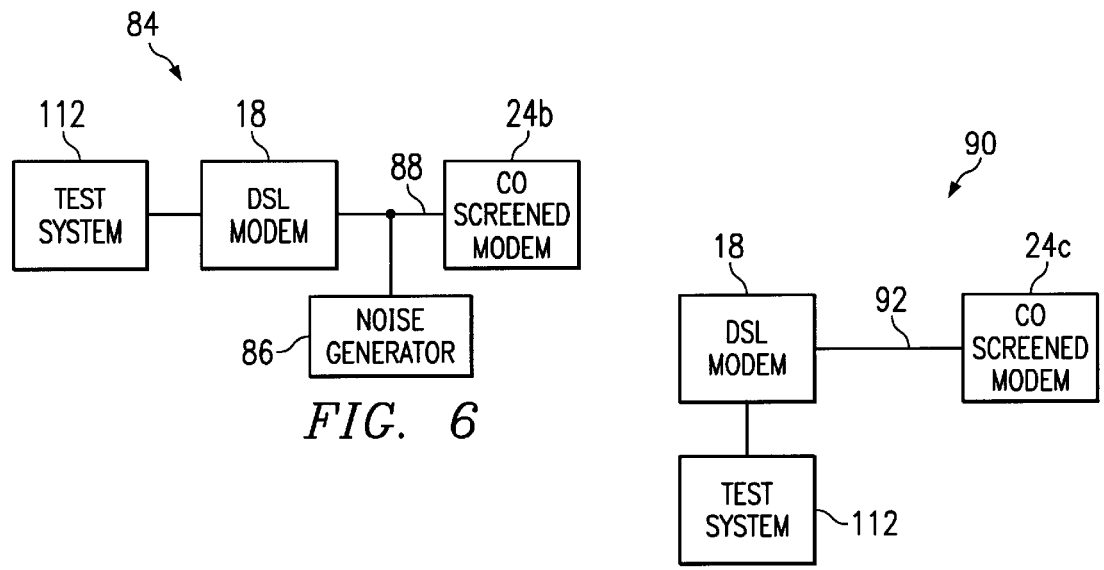
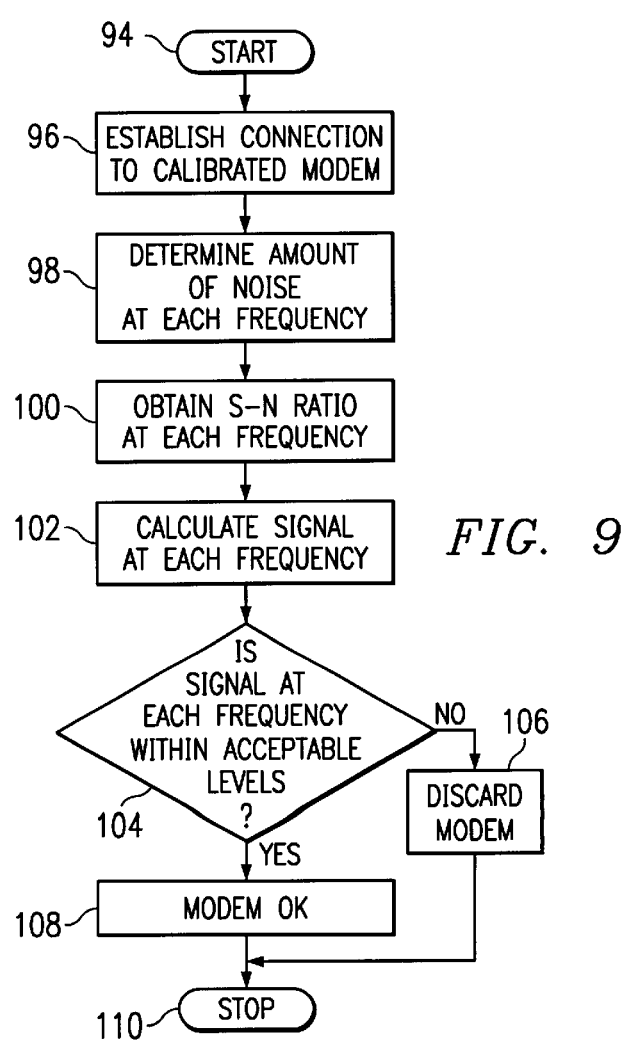

METHOD AND SYSTEM FOR TESTING A DIGITAL SUBSCRIBER LINE MODEM

TECHNICAL FIELD OF THE INVENTION

This invention relates generally to data communications and more particularly to method and system for testing a digital subscriber line modem.

BACKGROUND OF THE INVENTION

Data communication is becoming increasingly important in today's society. For example, the popularity of the Internet has expanded demand for high quality, high speed access to a variety of services available on the Internet. Although infrastructure enabling such data communication allows transmission of data at high speeds over large distances, a barrier remains to providing high quality, high speed data communications. Communicating data between a home user or a business and a central office of a service provider requires either utilizing existing communication lines, such as phone lines, between the service provider and the home or business user, or adding additional infrastructure, usually at significant expense.

Digital subscriber line (DSL) technology addresses the problem of connecting the central office of a service provider to a home user or business by utilizing a frequency spectrum available on existing telephone lines that is not used for voice traffic. The frequencies at which data are transmitted and received according to DSL technology are higher than the frequency spectrum used for voice traffic on a standard telephone line. Asynchronous digital subscriber line (ADSL) technology is a particular form of DSL. With ADSL, a different data rate is used for upstream transmission of data than is used for downstream reception of data.

DSL technology utilizes a modem both at a customer's location and a remote location, such as a service provider's central office. These modems allow communication between the customer and the service provider according to a DSL protocol. DSL modems typically perform three functions: (1) voice and data separation, (2) channel separation, and (3) encoding and decoding. A DSL modem conventionally has a component referred to as a plain old telephone service (POTS) splitter, which divides the existing phone line to two bands, one for voice and one for data. Voice travels between zero and four kilohertz. The higher frequencies are used for data. Another component in a DSL modem, referred to as a channel separator, divides the data into two parts. In ADSL this includes a larger part for downstream data and a smaller part for upstream data.

DSL uses one of a number of technologies to encode and decode data on a single carrier frequency. These technologies include (1) quadrature amplitude modulation (QAM), (2) carrierless amplitude and phase (CAP) modulation, and (3) discrete multi-tone (DMT) modulation. Quadrature amplitude modulation is a modulation technique using variations in signal amplitude. The modulation technique encodes data as discrete phase plus amplitude changes of a carrier tone. Carrierless amplitude and phase modulation is a modulation technique that allows multiple bits of information to be represented by a single frequency cycle. Discrete multi-tone modulation is a modulation technique that separates the frequency range in which data is transmitted and received into a plurality of frequency bands, or channels, using a Fast Fourier Transform. One example of DMT utilizes 256 frequency bands and uses a quadrature amplitude modulation to modulate data in any of these frequency bands.

A problem that arises with the use of DSL technology is that increased distances between the two modems decreases the available bandwidth and therefore decreases transmission rates. Two reasons for this are: (1) the series inductance of the telephone wire increases with distance and a telephone therefore decreases available bandwidth, and (2) a telephone line generally runs parallel with other telephone wires, which provides a parallel capacitance that increases with distance, which further decreases bandwidth and transmission rates.

Conventional methods for testing a DSL modem are time consuming and costly and are therefore not effective methods for testing mass produced modems.

SUMMARY OF THE INVENTION

A need has arisen for an improved method and system for testing a digital subscriber line modem. The present invention provides a system and method for testing a digital subscriber line modem that addresses shortcomings of prior systems and methods.

According to one embodiment of the invention, a method for testing the frequency response of a communication device that when operated determines a signal-to-noise ratio for a plurality of frequency bands includes receiving a signal-to-noise ratio generated by the communication device for each of the plurality of frequency bands. The method also includes receiving the amount of noise at each of the plurality of frequency bands, and determining, for each of the plurality of frequency bands, the magnitude of the signal at each of the plurality of frequency bands based on the signal-to-noise ratio and the amount of noise at each frequency band. Thereby the frequency response of the communication device is determined.

According to another embodiment of the invention, a system for testing a modem that determines a signal-to-noise ratio for a plurality of frequency bands includes a processor and a computer readable medium accessible by the processor. The computer readable medium stores a computer program. When executed on the processor, the computer program is operable to receive a signal-to-noise ratio generated by the modem for each of the plurality of frequency bands. The computer program is also operable to receive the amount of noise at each of the plurality of frequency bands and to determine, based on the received signal-to-noise ratio and the amount of noise at each of the plurality of frequency bands, the magnitude of the signal at each of the plurality of frequency bands.

Embodiments of the invention provide numerous technical advantages. For example, in one embodiment of the invention, a method is provided that substantially reduces the amount of time required to test a digital subscriber line modem by utilizing existing information regarding the signal-to-noise ratio at each of the plurality of frequency bands. Sweeping the frequency spectrum and measuring the signal at each of the frequencies for each tested modem is not necessary; therefore, DSL modems may be tested and provided in a more cost efficient manner.

Other technical advantages are readily apparent to one skilled in the art from the following figures, descriptions, and claims.

BRIEF DESCRIPTION OF THE DRAWINGS

For a more complete understanding of the present invention and the advantages thereof, reference is now made to the following descriptions taken in connection with the accompanying drawings in which:

FIG. 6 is a block diagram illustrating an example method for testing the DSL modem of FIGS. 1 and 2 according to the teachings of the invention;

FIG. 7 is a block diagram showing a second example method for testing the DSL modem of FIGS. 1 and 2 according to the teachings of the invention;

FIG. 9 is a flow chart showing steps associated with an example method for testing the DSL modem of FIGS. 1 and 2 according to the teachings of the invention.

DETAILED DESCRIPTION OF EXAMPLE EMBODIMENTS OF THE INVENTION

Example embodiments of the invention are best understood by referring to FIGS. 1 through 10 of the drawings, like numerals being used for like and corresponding parts of the various drawings.

Figure 1:
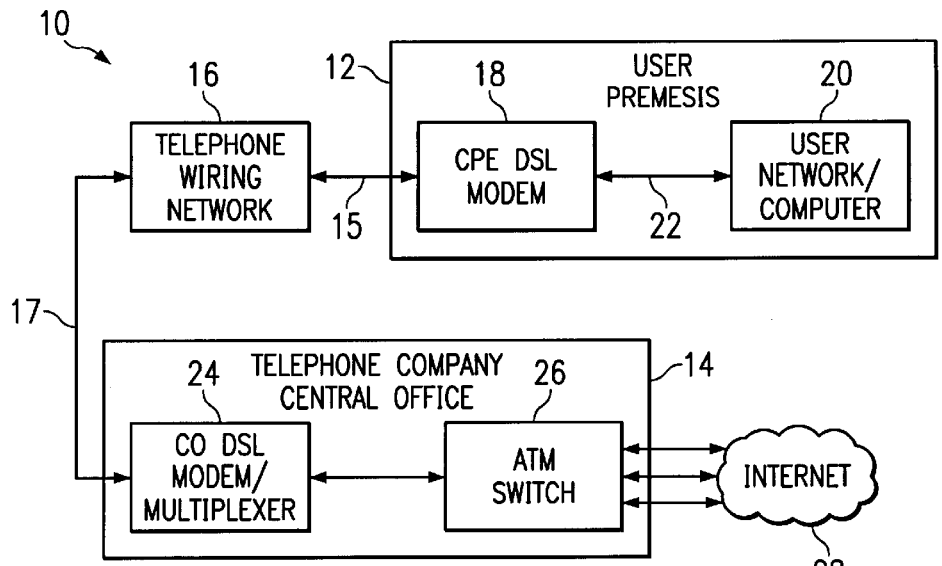
FIG. 1 is a block diagram of a communication network according to the teachings of the invention.

FIG. 1, is a block diagram of a DSL communication network 10 according to the teachings of the invention. DSL communication network 10 connects a user premises 12 to a telephone company central office 14 via a telephone wiring network 16. User premises 12 is a location at which a user, such as a business or a home computer user, maintains a computer for accessing the Internet, or other type of network. User premises 12 includes a DSL modem 18 and a user computer 20.

DSL modem 18 communicates data between telephone wiring network 16 and user computer 20. Such communication includes performing the voice and data separation, channel separation, and encoding and decoding, described above. A communication link 22 connects DSL modem 18 to user computer 20. Example communication links 22 include Ethernet communication links and asynchronous transfer mode (ATM) communication links.

In this example, DSL modem 18 utilizes discrete multi-tone (DMT) encoding to encode and decode transmitted and received data. Therefore, DSL modem 18 divides the frequency range for data transmissions into, in this example, 256 frequency ranges, also referred to as "bins" or "channels." As part of this operation, a signal-to-noise ratio for each of the frequency ranges is calculated by DSL modem 18. These signal-to-noise ratios are utilized according to the teachings of the invention to test the operation of DSL modem 18, as described in greater detail below.

Telephone company central office 14 provides communication of data between telephone wiring network 16 and a network 28, such as the Internet. Telephone company central office includes a central office DSL modem and multiplexer 24, commonly referred to as a "DSLAM." DSLAM 24 permits communication between telephone wiring network 16 and an ATM switch 26 at the telephone company central office 14 by performing the voice and data separation, channel separation, and encoding and decoding, described above. DSLAM 24 also provides multiplexing capability to allow a plurality of signals to be transmitted to and received from telephone wiring network 16 and combined into a single signal for transmission on a single high-speed backbone line within network 28 (not explicitly shown). ATM switch 26 receives one or more signals from DSLAM 24 and forwards the data onto network 28. Network 28 comprises any suitable network that may be used for communication with user premises 12 including, for example, the Internet.

Telephone wiring network 16 comprises, in this embodiment, conventional twisted pair telephone wire. Communication between telephone wiring network 16 and DSLAM 24 is effected through link 15, which also includes, in this embodiment, conventional twisted pair wire. Additional details of DSL modem 18 and a method and system for testing DSL modem 18 are described in greater detail below in conjunction with FIGS. 2 and 3A through 3E.

Figure 2:
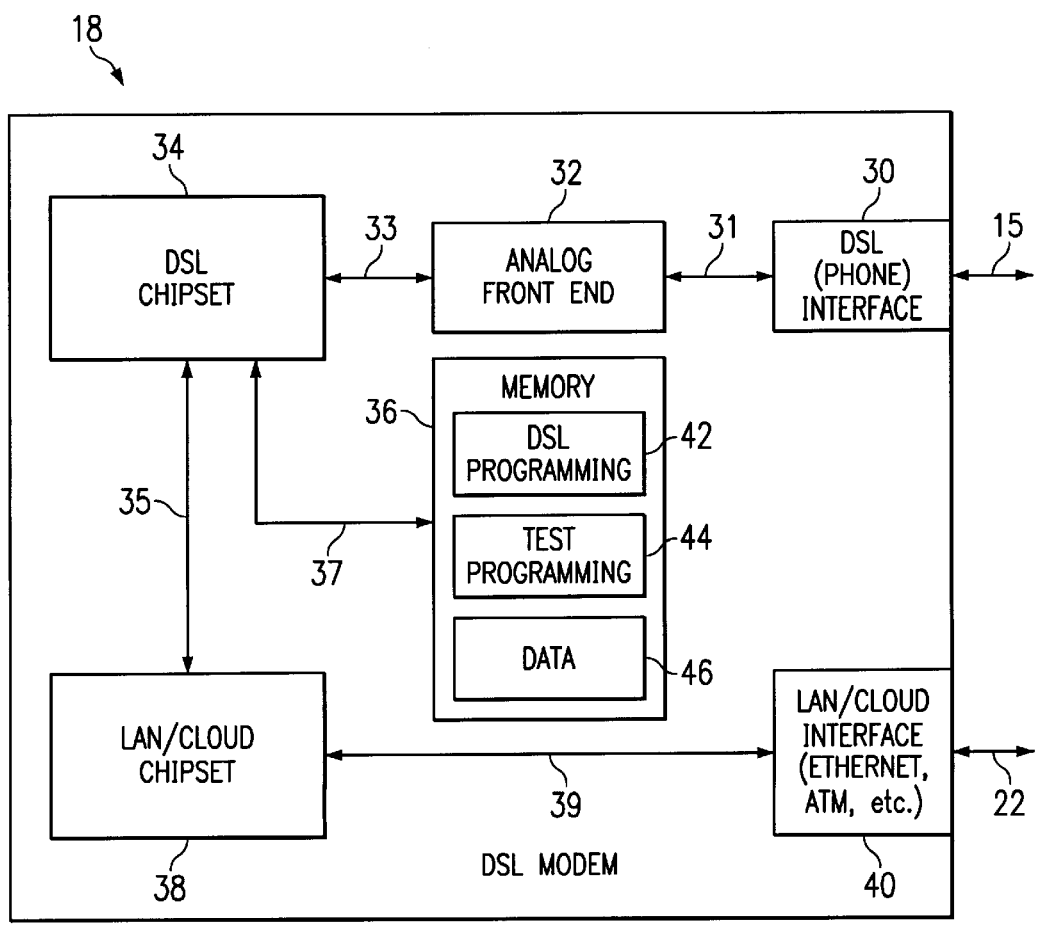
FIG. 2 is a block diagram of the digital subscriber line (DSL) modem of FIG. 1.

FIG. 2 is a block diagram of DSL modem 18. In this embodiment, DSL modem 18 includes a DSL interface 30, an analog front end 32, a DSL chipset 34, a memory 36, a local area network (LAN) chipset 38, and a LAN interface 40. According to the teachings of the invention, in this embodiment, memory 42 includes programming for receiving from DSL chipset 34 a signal-to-noise ratio for each frequency band of the plurality of utilized data frequency bands, and based on the signal-to-noise ratios, generates a frequency response for DSL modem 18, allowing confirmation of the proper operation of DSL modem 18. This test procedure is described in greater detail below.

DSL interface 30 provides an interface between telephone wiring network 16 and analog front end 32. Data are communicated between DSL interface 30 and telephone wiring network 16 over line 15, and data are communicated between DSL interface 30 and analog front end 32 over line 31. Analog front end 32 provides communication between DSL chipset 34 and DSL interface 30 over lines 31 and 33. DSL chipset 34 provides communication between analog front end 32 and LAN chipset 38 over lines 33 and 35. DSL chipset 34 also communicates with memory 36 to receive programming used in implementing functions of DSL chipset 34. DSL chipset 34 operates to perform voice and data separation, channel separation, and encoding/decoding of data. As described above, in this example, discrete multi-tone modulation is utilized; therefore, DSL chipset separates the frequency range utilized for DSL data communication into 256 separate frequency bands using a Fast Fourier Transform. In this example, quadrature amplitude modulation is used to modulate data on any given frequency channel.

Memory 36 is utilized by DSL chipset 34 to receive programming instructions and to store data. Memory 36 includes a DSL programming portion 42, a test programming portion 44, and a data portion 46. DSL programming portion 42 stores programming related to performing the above-described functions of DSL chipset 34. In this embodiment, test programming 44 provides programming utilized by DSL chipset 34 that allows efficient testing of DSL modem 18. Test programming portion 44 is described in greater detail below in conjunction with the flowchart of FIG. 10. Data portion 46 is used by DSL chipset 34 to store information. For example, DSL chipset 34 produces a signal-to-noise ratio for each of the plurality of frequency bands. Data portion 46 provides a location in which this information may be stored. LAN chipset 38 operates to convert the signals received from DSL chipset over line 35 into a format suitable for use in a local area network computing environment. LAN chipset 38 also operates to convert signals received from a local area network computing environment over line 39 to a format suitable for DSL chipset 34. LAN interface 40 provides an interface between a local area network computing network and LAN chipset 38. Additional details of components of DSL modem 18 are described below in conjunction with FIGS. 3A through 3E.

Figure 3A:
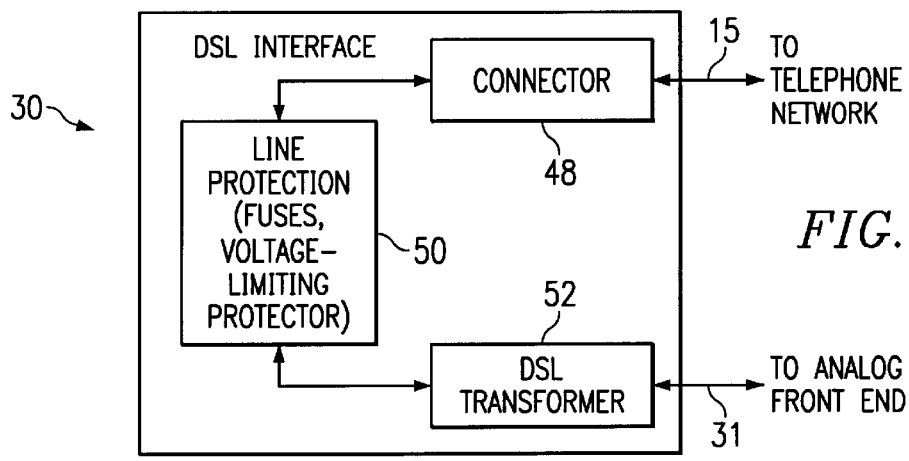
FIG. 3A is a block diagram of the DSL interface of the DSL modem of FIG. 2A showing additional details of the interface.

FIG. 3A is a block diagram of DSL interface 30. DSL interface 30 includes a connector 48, line protection circuitry 50, and a DSL transformer 52. Connector 48 is any suitable connector used to connect a telephone line 15 to modem 30. Line connection circuitry 50 may include fuses and voltage limiting protectors to protect modem 18 from surges in voltage levels. DSL transformer 52 converts electrical signals received by DSL interface 30 into appropriate levels for transferring over line 31 through analog front end 32.

Figure 3B:
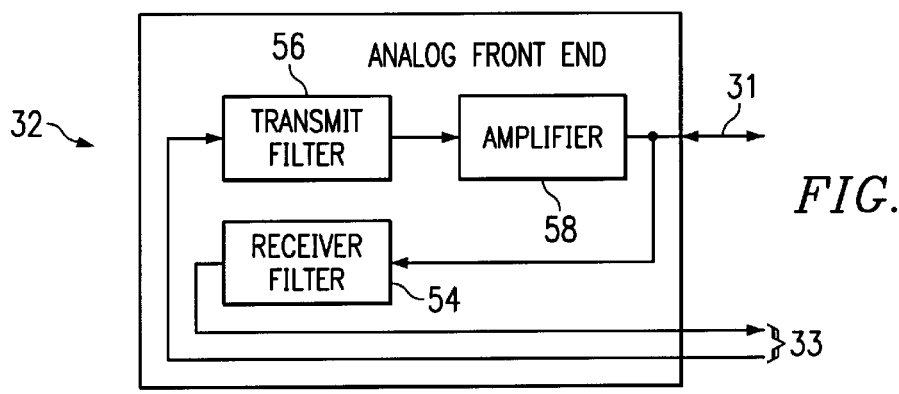
FIG. 3B is a block diagram of the analog front end of the DSL modem of FIG. 2A showing additional details of the analog front end.

FIG. 3B is a block diagram of analog front end 32. Analog front end 32 includes a receiver filter 54 for filtering signals received from DSL interface 30 over line 31 and a transmit filter 56 for filtering signals received from DSL chipset 34 over line 33. Analog front end 32 also includes an amplifier 58 for amplifying signals received from transmit filter 56 for a transmission over line 36 to telephone network 16 for eventual transmission to Internet 28. As described in greater detail below in conjunction with FIG. 4, proper operation of transmit filter 56 affects the available bandwidth, and therefore operation of modem 18.

Figure 3C:
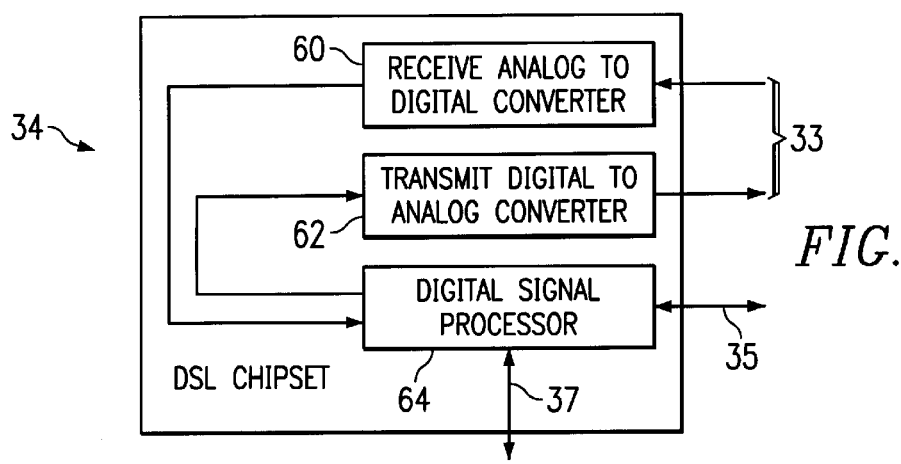
FIG. 3C is a block diagram of the DSL chipset of the DSL modem of FIG. 2A showing additional details of the chipset.

FIG. 3C is a block diagram of DSL chipset 34. DSL chipset 34 includes a receive analog-to-digital converter 60, a transmit digital-to-analog converter 62, and a digital signal processor 64. Receive analog-to-digital converter 60 converts an analog signal received over line 33 from analog front end 32 to a digital format for processing by digital signal processor 64. Transmit digital-to-analog converter 62 converts digital signals received from digital signal processor 64 to analog signals for transmission over line 33 to analog front end 32. Digital signal processor 64 receives digital data from LAN chipset 38 over line 35. Digital signal processor 64 performs operations on data received from LAN chipset 38 over line 35 and from analog front end 32 over line 33 to effect voice and data separation, channel separation, and encoding or decoding of data. Digital signal processor 64 incorporates discrete multi-tone modulation, and therefore, digital signal processor 64 separates transmitted and received data into a plurality of frequency bands. In this embodiment, separation is effected by utilizing a Fast Fourier Transform and digital signal processor 64 uses quadrature amplitude modulation within each frequency band to modulate or demodulate received or transmitted data. Because digital signal processor 64 separates the data into a plurality of frequency bands, digital signal processor 64 conventionally generates a signal-to-noise ratio for each of the frequency bands.

According to the teachings of the invention, the generated signal-to-noise ratios are used to test the frequency characteristics of DSL modem 18 and therefore transmit filter 56. Because the signal-to-noise ratios are automatically generated, such a testing procedure can be implemented in an efficient manner. Digital signal processor 64 also communicates with memory 36 over line 37 such that test programming 44 may obtain the signal-to-noise ratios generated by digital signal processor 64.

Figure 3D:
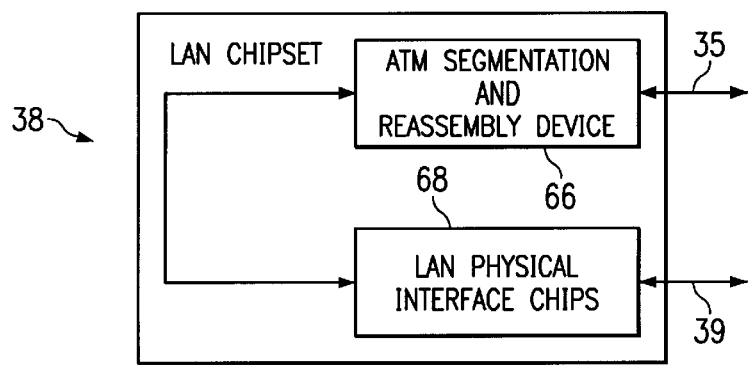
FIG. 3D is a block diagram of the local area network (LAN) LAN chipset of the modem of FIG. 2A showing additional details of the LAN chipset.

FIG. 3D is a block diagram of LAN chipset 38. In this embodiment, LAN chipset 38 includes an asynchronous transfer mode segmentation and reassembly device 66 an LAN physical interface chips 68. Asynchronous transfer mode segmentation and reassembly device 66 receives data from DSL chipset 34 over line 35 and formats the data appropriately for use in a local area network environment. LAN physical interface chips 68 perform operations on data received from asynchronous transfer mode segmentation and reassembly device 66 related to the physical interface.

Figure 3E:
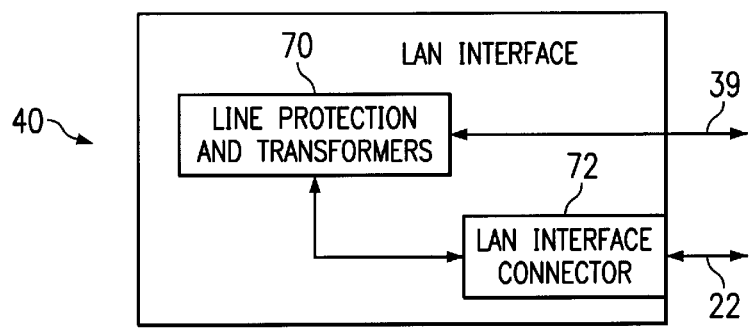
FIG. 3E is a block diagram of the LAN interface of the modem of FIG. 2A showing additional details of the LAN interface.

FIG. 3E is a block diagram of LAN interface 40. LAN interface 40 includes, in this embodiment, line protection circuitry 70 and a LAN interface connector 72.

Figure 4:
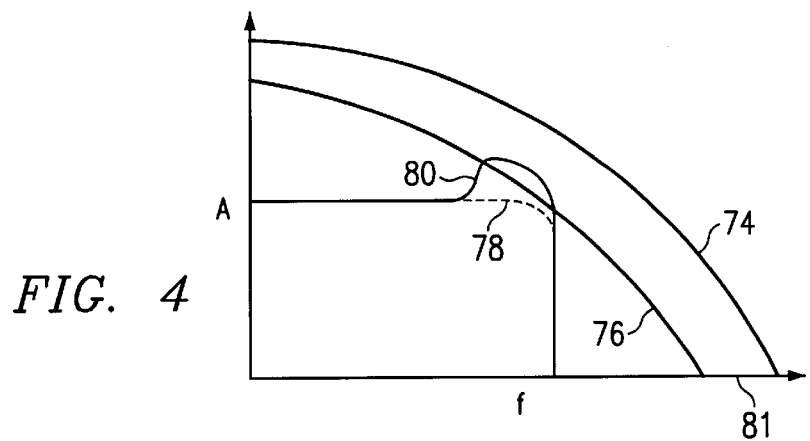
FIG. 4 is a graph of amplitude versus frequency showing the frequency response of the DSL modem of FIGS. 1 and 2 for two cases.

FIG. 4 is a graph of amplitude versus frequency, showing the frequency response of DSL modem 18. Digital subscriber line technology offers a greater bandwidth than is traditionally available using conventional technology with standard phone lines. However, as described above, the available bandwidth varies with distance between the customer DSL modem 18 and the DSL modem at the central office, such as in DSLAM 24. The varying bandwidth available due to increased distances between DSL modems is depicted pictorially in FIG. 4 by curves 74 and 76. Curve 74 is a graph of amplitude versus frequency that is available for transmission of data between DSL modems 18 and 24 that are located a first distance apart. At lower frequencies, greater amplitude differences are available, and at higher frequencies, lower amplitude differences are available. Thus, greater resolution of data is available at lower frequencies. Curve 76 represents the amplitude versus frequency curve that is obtained for a greater distance between DSL modems 18 and 24. Although the shape of curve 76 is similar to the shape of curve 74, at any given desired amplitude, a lesser amount of frequencies are available for transmission of data; thus, less data may be transmitted.

DSL modems 18 should produce signals that fall within the available amplitude versus frequency curve for any given distance between user premises 12 and the central office 14. For example, curve 18 represents the amplitude versus frequency response of a properly working DSL modem 18. Generally, transmit filter 56 controls the shape of curve 78. However, DSL modems 18 and transmit filter 56 do not always produce such a desired curve. For example, the amplitude versus frequency response for DSL modem 18 may look similar to curve 80. In such a case, the amplitude versus frequency response exceeds the available bandwidth designated by curve 76 and communication is hindered. Therefore, it is desirable to be able to quickly and efficiently determine that the amplitude versus frequency response of DSL modem 18 is within acceptable limits. A traditional method for such determination is described below in conjunction with FIG. 5.

Figure 5:
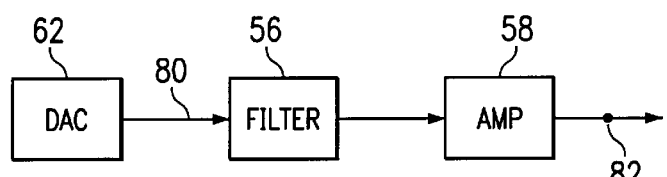
FIG. 5 is a block diagram of a number of components of a DSL modem showing a conventional testing technique.

FIG. 5 is a block diagram of a number of components of a DSL modem showing a conventional testing technique. According to conventional techniques, a known frequency is interjected between a digital-to-analog converter in a DSL modem, such as digital-to-analog converter 62, and a transmit filter in a DSL modem, such as transmit filter 56, and the amplitude of the signal at test node 82 is measured. The frequency is then incremented and the procedure is repeated until the frequency response of the DSL modem is determined. In addition, the noise floor may be measured at test point 82 by a volt meter. The noise floor is the level of noise present at all frequencies. This procedure of incrementing of the known frequency at point 80 and measuring the amplitude at point 82 is time consuming and not cost-effective for mass production of DSL modems.

FIG. 6 is a block diagram illustrating a system for testing DSL modem 18 according to the teachings of the invention. According to the teachings of the invention, the signal-to-noise ratio in each frequency band determined by DSL chipset 34 is utilized to determine the signal at each frequency of the plurality of the frequency bands. Furthermore, a known noise at each frequency is utilized. Therefore, based on the signal-to-noise ratio at each frequency and the noise at each frequency, the signal at each frequency is determined. If the signal at each of the frequency bands is known, the frequency response of modem 18 is known. For example, if the signal-to-noise ratio at 100 kilohertz is 10, and the known noise is 1 db then it is known that the signal transmitted by DSL modem 18 at 100 kilohertz is 10 db. A system 84 illustrated in FIG. 6 includes a noise generator 86 that may produce a known amount of noise and a short line 88 connecting DSL modem 18 and a central office DSL modem 24b. Central office modem 24b is screened such that it introduces either no noise or a known amount of noise. Line 88 is selected to be relatively short such that little noise, if any, is introduced into the system. Test system 112, which is described in greater detail in conjunction with FIG. 8, may be used to perform the testing functions. Alternatively, test programming 44 may include suitable instructions for effecting these steps by digital signal processor 64 without the use of test system 112.

FIG. 7 is a block diagram showing a second system for testing the DSL modem of FIG. 2 according to the teachings of the invention. System 90 includes a line 92 connecting DSL modem 18 and a central office modem 24c. Instead of interjecting a known noise, as described in conjunction with FIG. 6, the noise present at each of the relevant frequencies in system 90 is measured. This may be performed in a variety of ways, including generating by DSL modem 18 a small amplitude signal at each of the variety of frequencies and measuring any resulting signal on line 92 by a volt meter. The measured signal added to each frequency is the signal plus the noise. Since the signal at each frequency is known, the noise can be determined. The resulting noise numbers at each frequency may be used to detect a plurality of numbers of DSL modems 18, since the noise in system 90 will not vary with different DSL modems 18. Test system 112, which is described in greater detail in conjunction with FIG. 8, may be used to perform the testing functions. Alternatively, test programming 44 may include suitable instructions for effecting these steps by digital signal processor 64 without the use of test system 112.

Thus, by utilizing the signal-to-noise ratio provided by the digital multi tone digital signal processor 64, and connecting DSL modem 18 to a system having a known amount of noise, the frequency response over a desired range of frequencies may be determined. According to one implementation, if the frequency response of the DSL modem 18 does not fall within predetermined limits, the modem is discarded and replaced.

Figure 8:
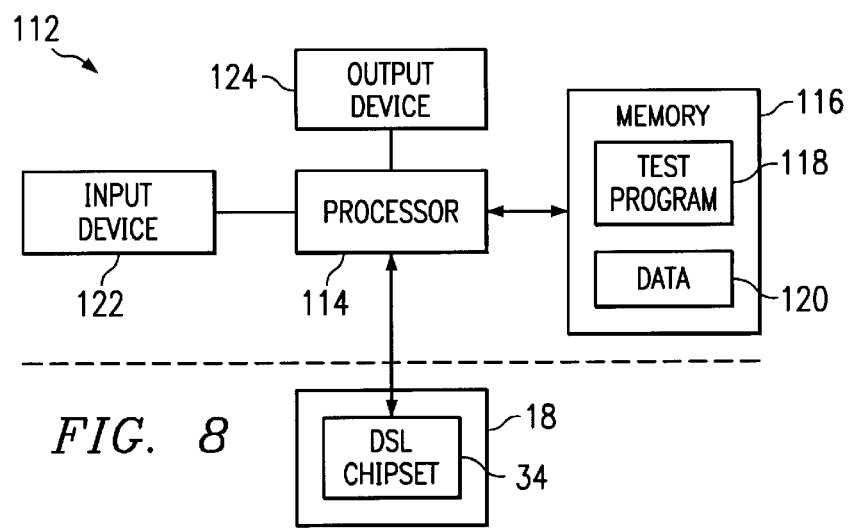
FIG. 8 is a block diagram showing a system for testing the DSL modem of FIGS. 1 and 2.

The above described method may be implemented by a variety of techniques, including by a computer executing a computer program stored on a computer readable medium that is programmed to perform the method. Such a system is illustrated in FIG. 8. System 112 includes a processor 114 connected to a memory 116. Memory 116 includes a test program 118 programmed to execute the steps described above and below for determining the frequency response of DSL modem 18. Memory 118 also may store data 120, which may include known noise at each of the relevant frequencies. System 112 may also include an input device 112 for providing to processor 114 and memory 116 the level of noise at each of the relevant frequencies. System 112 may also include an output device 124 for reporting of the testing procedure described above. A processor 114 may be connected to DSL chipset 34 in any suitable way that allows acquisition of the signal-to-noise ratios conventionally generated by a digital multi tone DSL chipset 34. For example, DSL chipset 34 may be programmed by test programming 44 to output on a given port (not explicitly shown) the signal-to-noise ratio at each frequency for receipt by processor 114. Alternatively, test programming 44 may include suitable instructions for effecting, by digital signal processor 64, these steps, or other suitable implementations utilizing the signal-to-noise ratios generated by DSL modem 18 to determine the frequency response of DSL modem 18.

FIG. 9 is a flow chart showing steps associated with a method for testing DSL modem 18 according to the teachings of the invention. The method begins at step 94. At step 96, DSL modem 18, which is to be tested, is connected to a tester modem, such as modems 24B and 24C. The modem to which DSL modem 18 is connected may have known or unknown noise properties. If the noise properties are known, these properties are used later to determine the frequency response of DSL modem 18. If not, a noise measurement is made later in the method. At a step 96, communication is established between the tester modem and DSL modem 18. This establishment of communication is also referred to as "training."

At a step 98, the amount of noise at each frequency at which data is transferred is determined. This may occur in a variety of ways. For example, the noise present in the test communication system may be measured, as described above in conjunction with FIG. 7. As an alternative, central office modem 24 may be screened, such that it introduces little or a known amount of noise, and noise generator 86 may introduce a known amount of noise. Other techniques may also be used to determine the amount of noise at each frequency relevant to the frequency response of DSL modem 18. The known amount of noise is then provided to test system 112, DSL chipset 34, memory 42, or other suitable location for use in determining the frequency response of DSL modem 18.

At a step 100, the signal-to-noise ratio of the signal generated by DSL modem 18 is obtained from DSL modem 18. This may occur by requesting such information from data portion 46 of memory 42, requesting such information from DSL chipset 34, or through other suitable techniques.

At a step 102, based on the signal-to-noise ratio at each frequency determined at step 100, and the amount of noise at each frequency determined at step 98, the signal at each frequency is calculated. The signal at each frequency is equal to the signal-to-noise ratio multiplied by the known amount of noise. Processor 114, digital signal processor 64, or other suitable device may be utilized to perform such a calculation.

A comparison is made at step 104 for each frequency to an acceptable level at each frequency. The comparison may be performed by processor 114 executing test program 118, by digital signal processor 64 executing test programming 44, or through other suitable techniques. If the signal at any frequency is not within acceptable levels, the modem is discarded at step 106. If the signal at each frequency is within acceptable levels, the modem is determined to be acceptable at step 108. The method concludes at step 110.

Figure 10:
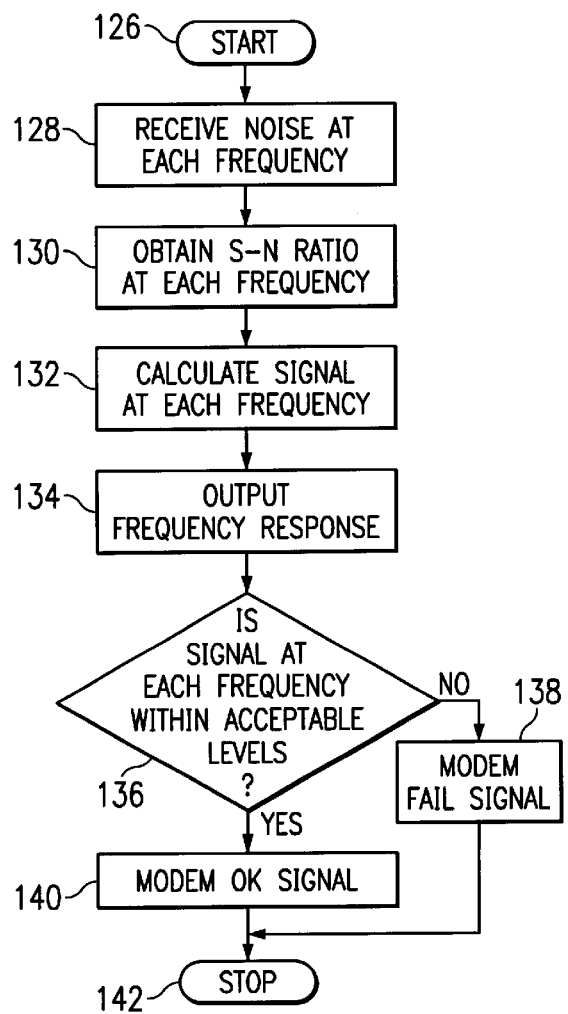
FIG. 10 is a flow chart illustrating steps associated with the test programming of the DSL modem of FIGS. 1 and 2 utilized to test the performance of the DSL modem according to the teachings of the invention.

FIG. 10 is a flowchart illustrating steps associated with test programming 44 that are utilized to test the performance of DSL modem 18. In the illustrated embodiment of FIG. 2, test programming 44 within modem DSL modem 18 includes suitable coding to implement the testing procedure, and DSL chipset 34 provides an indication of whether the frequency response of modem 18 is acceptable. According to one such embodiment, test programming 44 executes the following steps.

The method begins at step 126. At step 128, the noise at each relevant frequency is received by test programming 44. This may occur through querying DSL chipset 34 and associated data portion 46 for the known noise levels associated with each frequency. These noise levels may be obtained according to any suitable method including those described above. At a step 130, the signal-to-noise ratio at each frequency is obtained. According to conventional operations, a digital multi-tone DSL chipset, such as DSL chipset 34, calculates such signal-to-noise ratios upon DSL modem 18 training with another modem, such as DSL modem 24. Therefore, test programming 44 contains these known values at step 130. At step 132, based upon the known values of noise and the signal-to-noise ratio at each frequency, the signal generated by DSL modem 18 is calculated at each frequency. At step 104, the frequency response of DSL modem 18 may be provided by DSL chipset 34 to user. Alternatively, the actual frequency spectrum is not provided.

At step 136, a determination is made of whether the signals at all relevant frequencies are within acceptable levels. If they are not, the modem fails at step 138 and a signal is generated for a user indicating so. If the signals at all frequencies of interest are at acceptable levels, a signal is provided at step 140 indicating the modem is acceptable. The method concludes at step 142. The functions of test programming 44 may be implemented through software executed by digital signal processor 64, or by any other suitable technique, including an application specific integrated circuit implementing both the DSL modem functions as well as the above-described test functions.

Although the present invention and its advantages have been described in detail, it should be understood that various changes, substitutions and alterations can be made therein without departing from the spirit and scope of the present invention as defined by the appended claims.

What is claimed is:

1. A method for testing the frequency response of a communication device that when operated determines a signal-to-noise ratio for a plurality of frequency ranges, the method comprising:
   receiving a signal-to-noise ratio generated by the communication device for each of the plurality of frequency bands;
   receiving the amount of noise at each of the plurality of frequency bands; and
   testing a frequency response of the communication device by determining, for each of the plurality of frequency bands, the magnitude of the signal at each of the plurality of frequency bands based on the signal-to-noise ratio and the amount of noise at each frequency band.

2. The method of claim 1, wherein determining the magnitude of the signal at each of the plurality of frequency bands comprises determining, by the communication device, the magnitude of the signal at each of the plurality of frequency bands.

3. The method of claim 2, wherein determining, by the communication device, the magnitude of the signal at each of the plurality of frequency bands comprises determining by a computer program stored within the communication device the magnitude of the signal at each of the plurality of frequency bands.

4. The method of claim 1, wherein determining the magnitude of the signal at each of the plurality of frequencies comprises determining, by a computer program stored external to the communication device, the magnitude of the signal at each of the plurality of frequencies.

5. The method of claim 1, wherein receiving the signal-to-noise ratio generated by the communication device for each of the plurality of frequency bands comprises receiving at a memory location within the communication device the signal-to-noise ratio generated by the communication device.

6. The method of claim 1, wherein receiving the signal-to-noise ratio generated by the communication device for each of the plurality of frequency bands comprises receiving at a memory location external to the communication device the signal-to-noise ratio generated by the communication device.

7. A method for testing a modem that, when operated, determines a signal-to-noise ratio for a plurality of frequency bands, the method comprising:
   establishing a signal over a communication link between modem and another communication device to form a test communication system;
   determining the amount of noise present in the test communication system in each of the plurality of frequency bands;
   receiving for each of the plurality of frequency bands, the signal-to-noise ratio determined by the modem; and
   determining based on the noise at each of the frequency bands and the received signal-to-noise ratio at each of the plurality of frequency bands the signal magnitude at each of the plurality of frequency bands.

8. The method of claim 7, wherein establishing a communication link comprises establishing a communication link between a discrete multi tone modem and another communication device.

9. The method of claim 7, wherein determining the amount of noise present in the test communication system in each of the frequency bands comprises measuring the amount of noise in the communication system.

10. The method of claim 7, wherein determining the amount of noise present in the test communication system in each of the frequency bands comprises measuring the amount of noise in a second communication system having similar noise properties to the test communication system.

11. The method of claim 10, and further comprising forming the second communication system by connecting another communication device to a second modem by the communication link, the second modem having similar noise properties to the modem.

12. The method of claim 7, wherein determining the amount of noise present in the test communication system in each of the frequency bands comprises introducing a known amount of noise into the test communication system at each of the plurality of frequency bands.

13. The method of claim 7, wherein receiving the signal-to-noise ratios comprises receiving the signal-to-noise ratios at a memory location within the modem.

14. The method of claim 7, wherein receiving the signal-to-noise ratios comprises receiving the signal-to-noise ratios at a memory location external from the modem.

15. The method of claim 7, wherein determining based on the noise at each of the frequency bands and the received signal-to-noise ratio at each of the plurality of frequency bands the signal magnitude at each of the plurality of frequency bands comprises multiplying the received signal-to-noise ratio at each of the frequency bands by the respective noise at the frequency band.

16. A system for testing a modem that determines a signal-to-noise ratio for a plurality of frequency bands, the system comprising:

a processor; and a computer readable medium accessible by the processor and storing a computer program operable when executed on the processor to:

receive a signal-to-noise ratio generated by the modem for each of the plurality of frequency bands;

receive the amount of noise at each of the plurality of frequency bands; and determine, based on the received signal-to-noise ratio and the amount of noise at each of the plurality of frequency bands, the magnitude of the signal at each of the plurality of frequency bands.

17. The system of claim 16, wherein the processor and the memory reside external to the modem.

18. The system of claim 16, wherein the processor and the memory reside within the modem.

19. The system of claim 16, wherein the computer program determines the magnitude of the signal at each of the plurality of frequency bands by multiplying the signal-to-noise ratio by the noise at each of the frequency bands.

20. A modem for transmitting and receiving communications comprising:

a processor; and a computer readable medium storing computer programming operable when executed on the processor to:

separate a received communication into voice and data components;

divide the data component into a plurality of frequency bands;

decode the received data within each frequency band;

generate a signal-to-noise ratio for each of the frequency bands;

determine the magnitude of an output signal at each of the frequency bands based on the signal-to-noise ratio and a known value of noise at each of the frequency bands; and initiate transmission of an output signal at each of the frequency bands over a communications line.

21. The method of claim 1, wherein receiving the amount of noise comprises measuring the amount of noise.

22. The method of claim 1, wherein receiving the amount of noise comprises receiving a known value indicating the amount of noise.

* * * * *